United States Patent
Che et al.

(10) Patent No.: US 10,042,774 B2
(45) Date of Patent: Aug. 7, 2018

(54) METHOD AND APPARATUS FOR MASKING AND TRANSMITTING DATA

(71) Applicant: Advanced Micro Devices, Inc., Sunnyvale, CA (US)

(72) Inventors: Shuai Che, Bellevue, WA (US); Jieming Yin, Bellevue, WA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 15/268,974

(22) Filed: Sep. 19, 2016

(65) Prior Publication Data
US 2018/0081818 A1    Mar. 22, 2018

(51) Int. Cl.
G06F 12/00    (2006.01)
G06F 12/0897    (2016.01)
G06F 13/00    (2006.01)
G06F 13/28    (2006.01)

(52) U.S. Cl.
CPC ...... *G06F 12/0897* (2013.01); *G06F 2212/60* (2013.01)

(58) Field of Classification Search
CPC .................. G06F 12/0897; G06F 2212/60
See application file for complete search history.

(56) References Cited

U.S. PATENT DOCUMENTS

| | | | | |
|---|---|---|---|---|
| 4,626,824 A * | 12/1986 | Larson | ............. | H03M 7/3066 341/95 |
| 6,101,579 A * | 8/2000 | Randolph | .......... | G06F 12/0893 365/189.05 |
| 7,447,814 B1 * | 11/2008 | Ekman | ............. | G06F 12/08 710/68 |
| 8,321,640 B2 * | 11/2012 | Kwak | ............. | G11C 11/4096 711/154 |
| 2003/0131184 A1 * | 7/2003 | Kever | ............. | G06F 12/0802 711/100 |
| 2005/0066205 A1 * | 3/2005 | Holmer | ............. | G06F 1/3203 713/320 |
| 2009/0138536 A1 * | 5/2009 | Chao | ............. | G06F 17/17 708/290 |
| 2011/0145506 A1 | 6/2011 | Cherukuri et al. | | |

(Continued)

FOREIGN PATENT DOCUMENTS

WO    2014137489 A1    9/2014

OTHER PUBLICATIONS

Alameldeen, A. et al., "Frequent Pattern Compression: A Significance-Based Compression Scheme for L2 Caches", Technical Report 1500, Apr. 2004, 14 pgs., Computer Sciences Department, University of Wisconsin, Madison, WI, USA.

(Continued)

*Primary Examiner* — Mark A Giardino, Jr.
(74) *Attorney, Agent, or Firm* — Volpe and Koenig, P.C.

(57) ABSTRACT

A method and apparatus for transmitting data includes determining whether to apply a mask to a cache line that includes a first type of data and a second type of data for transmission based upon a first criteria. The second type of data is filtered from the cache line, and the first type of data along with an identifier of the applied mask is transmitted. The first type of data and the identifier is received, and the second type of data is combined with the first type of data to recreate the cache line based upon the received identifier.

24 Claims, 3 Drawing Sheets

(56) References Cited

U.S. PATENT DOCUMENTS

| | | |
|---|---|---|
| 2015/0186282 A1 | 7/2015 | Rahme et al. |
| 2015/0220573 A1 | 8/2015 | Attaluri et al. |
| 2015/0227372 A1* | 8/2015 | Henry ................. G06F 9/30145 |
| | | 714/23 |
| 2016/0092366 A1 | 3/2016 | Pal et al. |

OTHER PUBLICATIONS

Altera Corporation, "Altera SDK for OpenCL Best Practices Guide" OCL003-15.0.0, May 4, 2015, 80 pgs., San Jose, CA, USA.
He, Bingsheng, "When Data Management Systems Meet Approximate Hardware: Challenges and Opportunities", Proceedings of the VLDB Endowment, Sep. 1-5, 2014, pp. 877-880, vol. 7, No. 10, VLDB Endowment, Hangzhou, CN.

* cited by examiner

US 10,042,774 B2

METHOD AND APPARATUS FOR MASKING AND TRANSMITTING DATA

BACKGROUND

A network-on-chip (NoC) system is a communication system between memory hierarchies in a system-on-chip (SoC) system that includes an interconnect fabric to transmit data between memory hierarchies. Due to bandwidth constraints, the NoC can be a bottleneck for many applications in multi-, or many-core architectures. Applications often present the communication system with significant amounts of memory accesses and inter-core communications requests.

A conventional solution utilizes frequent pattern compression (FPC), which compresses individual cache lines on a word-by-word basis by storing common word patterns in a compressed format accompanied with an appropriate prefix. However, FPC does not compress data at a network interface.

BRIEF DESCRIPTION OF THE DRAWINGS

A more detailed understanding can be had from the following description, given by way of example in conjunction with the accompanying drawings.

DETAILED DESCRIPTION

Computer systems utilize a predefined number of bits, or bit width, to represent data (e.g., 32 or 64 bit integer, 32-bit floating point, or 64-bit double precision floating point). Different applications running on the systems require different computation needs and some require fewer bits to operate sufficiently. For image and video processing, for example, data is imprecise when represented in hardware. Therefore, image and video processing applications can tolerate inaccuracy in the data. For example, floating-point computations used in image and video processing can use fewer bits for the mantissas part of the computation. For other applications (e.g., sorting integers in a spreadsheet), calculations need to be precise and correct. However, if programmers know the numbers to be calculated are within a range (e.g. 0~2048) for a particular application, comparisons in sorting can ignore the most significant bits during the calculation. Accordingly, processors can be inefficient in some cases, wasting resources and power because not all the bits in a cache line/register are useful to conduct the calculation.

Network-on-chip (NoC) optimizations can be employed to provide a more efficient way of transmitting data over an interconnect fabric between cores/caches, or between any two levels of the memory hierarchy connected to the interconnect fabric. Although further detail will be described below, a masked-based filtering approach depending on application needs is utilized so only useful bits are transferred across the interconnect of the network. This can result in reducing the number of network flow control digits (flits) and improving network bandwidth utilizations.

Figure 1:
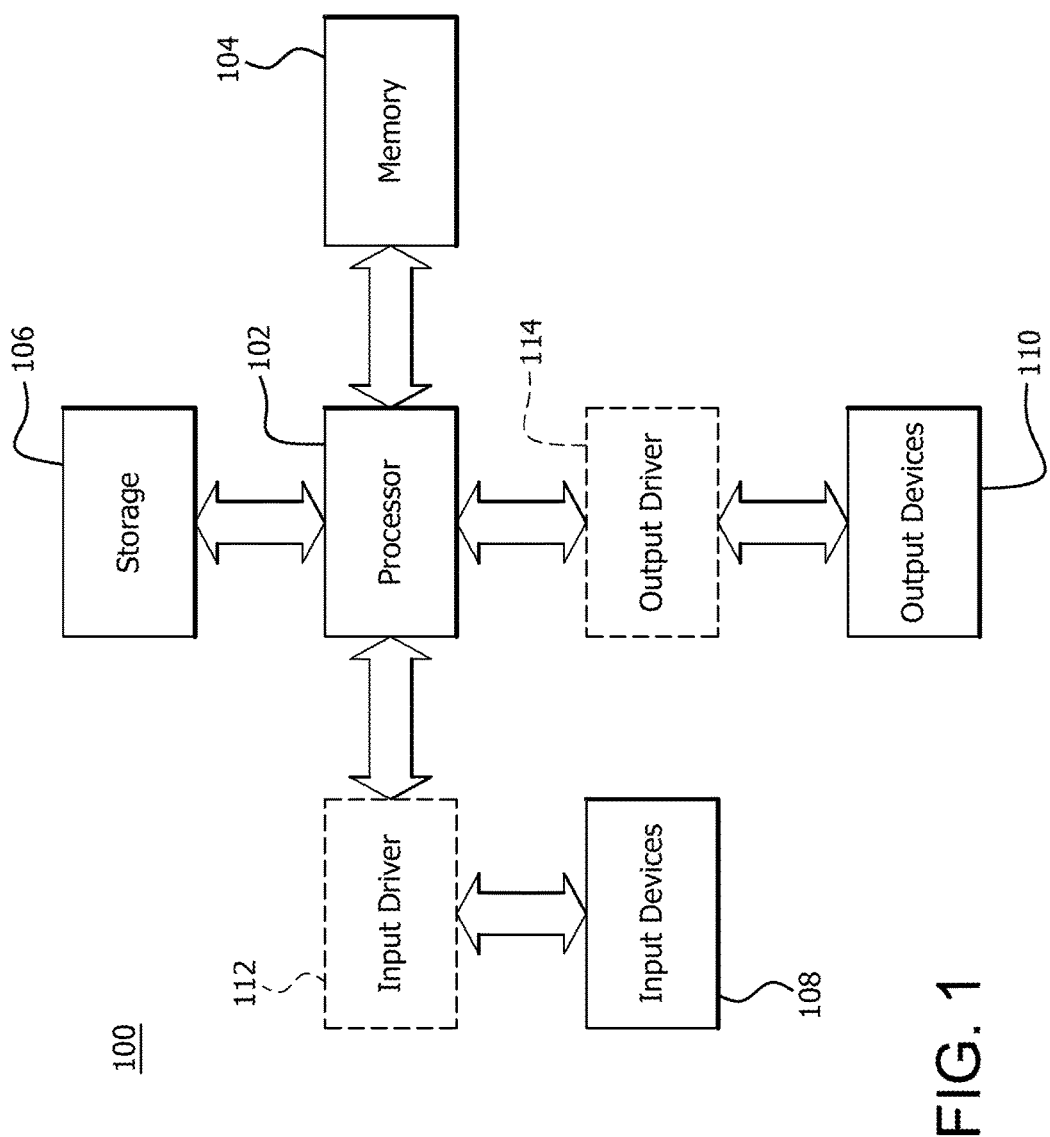
FIG. 1 is a block diagram of an example device in which one or more disclosed examples can be implemented.

FIG. 1 is a block diagram of an example device 100 in which one or more disclosed embodiments can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114.

The processor 102 can include a central processing unit (CPU), a graphics processing unit (GPU), a CPU and GPU located on the same die, or one or more processor cores, wherein each processor core can be a CPU or a GPU. The memory 104 can be located on the same die as the processor 102, or can be located separately from the processor 102. The memory 104 can include a volatile or non-volatile memory, for example, random access memory (RAM), dynamic RAM (DRAM), or a cache.

The storage 106 can include a fixed or removable storage, for example, a hard disk drive, a solid state drive, an optical disk, or a flash drive. The input devices 108 can include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 can include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Figure 2:
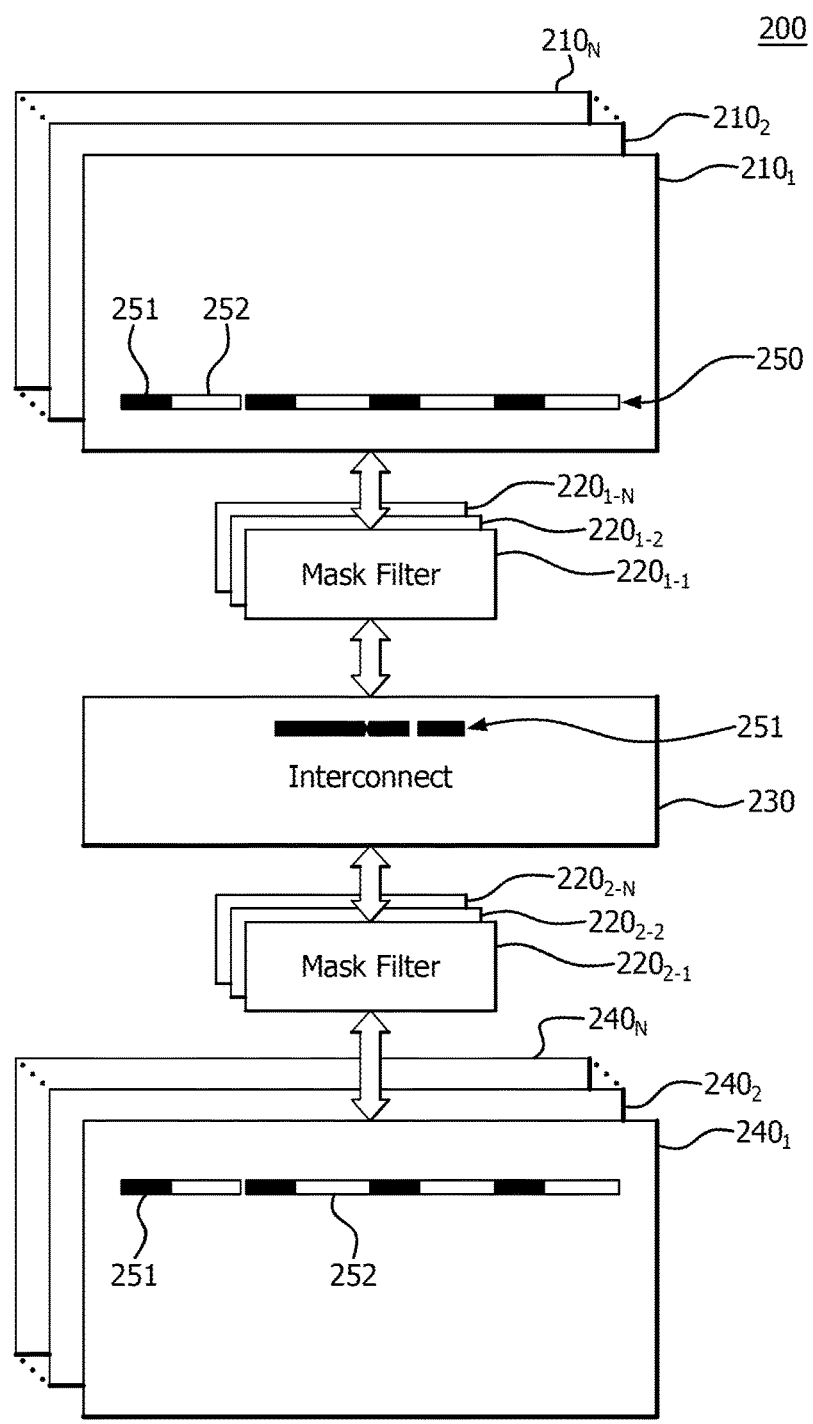
FIG. 2 is a block diagram of an example network-on-chip (NoC) system.

FIG. 2 is a block diagram of an example NoC system 200. The example system 200 includes one or more first level memory components 210 (e.g., processor cores, L1 caches) (designated $210_1, 210_2, \ldots, 210_N$), one or more mask filters $220_1$ and $220_2$, (designated $220_{1-1}, 220_{1-2}, \ldots, 220_{1-N}$, and $220_{2-1}, 220_{2-2}, \ldots, 220_{2-N}$), an interconnect 230, and one or more second level memory components 240 (e.g., cache partitions such as an L2 or last level cache) (designated $240_1, 240_2, \ldots, 240_N$). In addition, second level memory components 240 can provide off-chip memory channels, such as in the case of L2 caches. The NoC system 200 includes cache lines 250, which contain useful data bits 251 and non-useful bits 252 for transmission between first level memory components 210 and second level memory components 240. The mask filters $220_1$ are associated with respective first level memory components 210, while the mask filters $220_2$ are associated with respective second level memory components 240. The useful data bits 251 are those bits that are necessary to perform a desired calculation, while the non-useful bits 252 are those bits that are not needed to perform the desired calculation, such as in the examples mentioned above. For example, the non-useful bits 252 can include "don't care" bits that aren't needed or used by an application for the desired calculation.

Figure 3:
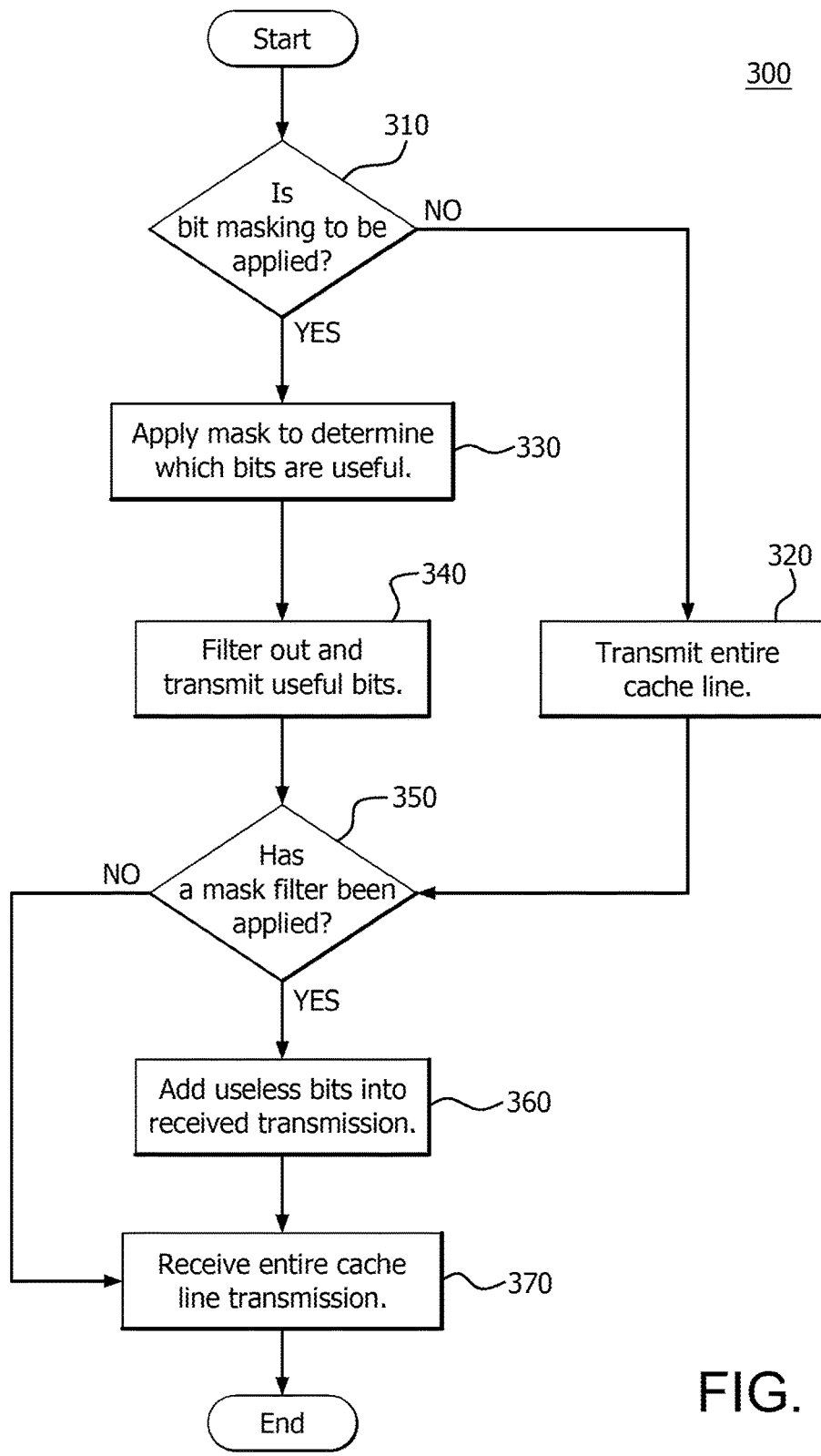
FIG. 3 is a flow diagram of an example method for masking and transmitting data.

FIG. 3 is a flow diagram of an example method 300 for masking and transmitting data. Briefly, method 300 employs a mask structure to indicate which bits are useful. Because data transfers in the memory hierarchy happen at the granularity of a cache line (e.g., cache line 250 of FIG. 2) or a memory block in dynamic randomly accessed memory (DRAM), the mask in the method 300 marks the useful bits in the cache line. For example, the mask identifies which bytes in a cache line are useful (at the byte level) or it specifies which ranges of bits are active (at the bit level).

In step 310, it is determined whether bit masking is to be applied. This is determined, for example, depending on an application's needs. That is, for an application that requires precise calculations, bit masking is not applied and the entire cache line is transmitted (step 320). For example, referring back to FIG. 2, the cache line 250 in first level memory component $210_1$ is transmitted via the interconnect 230 to second level memory component $240_1$ in its entirety (i.e., including useful bits 251 and non-useful bits 252).

If it is determined to apply bit masking (step 310), then a mask is applied to determine which bits are useful (step 330). The mask can be defined at a programming-language level by a programmer (e.g., user-defined or specific data types such as 7-bit integer). Alternatively, the mask can be configured with an application program interface (API), or utilizing instruction set architecture (ISA) extensions. For example, an application can be programmed to perform a call to an API function (e.g., set_mask, unset_mask), specifying the mask value. With programming language support (e.g., specific type int8bit, int24bit), the compiler can translate the code into machine ISAs with instructions (e.g., specific loads and stores, load8bit, store24bit, etc.) that provide hints to hardware for setting the mask values.

The application of the mask in step 330 is performed by the mask filter $220_1$ (e.g., $220_{1-1}$) to the cache line 250. The mask values (i.e., information defining the configuration of the mask) can be stored in registers in the mask filters $220_1$, in which programmers or system software has access to write the values. For example, the mask filter $220_{1-1}$ reads identifiers that are included in an extra field provided in the cache line 250 that identify what mask to apply, if any, when transmitting cache line 250 across the interconnect 230.

Once applied in step 330, the mask filter $220_{1-1}$ filters out the non-useful bits 252 from cache line 250 and transmits only useful bits 251 across the interconnect 230 (step 340). That is, the transmitted bits are concatenated from the original cache line 250. In addition, the identifiers are also transmitted so that mask filter $220_{2-1}$ will be able to decipher what mask values have been applied. For example, the identifiers are transmitted in packet headers. Alternatively, different types of data can be mapped to different cache ways without requiring additional fields (e.g., headers) being added, where each cache way is associated with a particular mask identifier. In these ways, the mask filter $220_{2-1}$ is aware of which mask to apply to process the data when it is received by accessing the information relating to that mask in its registers.

In another alternative, in the case of streaming data (i.e., where segments of data of the same type are transmitted successively), once the mask identifier is transmitted the first time, it is not sent again until data is to be transmitted requiring a different mask, or an invalidation occurs. In this alternative, the mask filter $220_{2-1}$ receives the identifier when the mask is first configured, and then receives only subsequent transmissions of concatenated bits without an identifier of the mask until the mask changes.

Accordingly, in step 350, the mask filter $220_{2-1}$ determines whether a mask filter has been applied. That is, it reads the identifier to determine whether or not the data transmission it has received is a set of concatenated bits or an entire cache line. If a mask has not been applied, then the transmission is passed along to the second level memory component $240_1$, which receives the entire cache line 250 transmission (step 370).

If, however, a mask has been applied, then the mask filter $220_{2-1}$ applies the mask to the data in accordance with the identifier and combines the useful bits 251 and the non-useful bits 252 by inserting the non-useful bits 252 back into the transmission (step 360) for forwarding to the second level memory component $240_1$, which again receives the cache line 250 (e.g., the entire cache line) transmission (step 370). That is, the mask filter $220_{2-1}$ combines the useful bits 251 and the non-useful bits 252 together to recreate the entire cache line for the second level memory component $240_1$.

It should be understood that many variations are possible based on the disclosure herein. Although features and elements are described above in particular combinations, each feature or element can be used alone without the other features and elements or in various combinations with or without other features and elements. For example, the method described above can be implemented for interconnecting stacked DRAM or non-volatile memory (NVM). Also, hardware or software controlled data movement across different memories and memory levels (such as page migrations, DMA transfers, or the like) can utilize the above method.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements aspects of the embodiments.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

A method for transmitting data is disclosed herein. The method includes determining whether to apply a mask to a cache line that includes a first type of data and a second type of data for transmission based upon a first criteria. The second type of data is filtered from the cache line, and the first type of data along with an identifier of the applied mask is transmitted. The first type of data and the identifier is received, and the second type of data is combined with the first type of data to recreate the cache line based upon the received identifier.

In some examples, the first criteria includes whether the cache line is executed by an application that does not require precise calculations. In some examples, the first type of data includes useful data and the second type of data includes non-useful data.

In some examples, the applied mask is based upon a user-defined parameter. In some examples, the applied mask is based upon a type of data to be transmitted. In some examples, the identifier is transmitted in a packet header. In some examples, a particular identifier is associated with a particular cache way.

An apparatus for transmitting data is disclosed herein. The apparatus includes a first level memory component configured to transmit a cache line that includes a first type of data and a second type of data. A first mask filter is operatively coupled to the first level memory component, and configured to determine whether to apply a mask to the cache line for transmission based upon a first criteria, to filter the second type of data from the cache line, and transmit the first type of data and an identifier of the applied mask over an interconnect fabric. A second mask filter is operatively coupled to the first mask filter via the interconnect fabric, and is configured to receive the first type of data and the identifier, and combine the second type of data with the first type of data to recreate the cache line based upon the received identifier. A second level memory component is operatively coupled to the second mask filter, and is configured to receive the cache line from the second mask filter.

In some examples, the first criteria includes whether the cache line is executed by an application that does not require precise calculations. In some examples, the first type of data includes useful data and the second type of data includes non-useful data.

In some examples, the applied mask is based upon a user-defined parameter. In some examples, the applied mask is based upon a type of data to be transmitted. In some examples, the first mask filter transmits the identifier in a packet header. In some examples, the first mask filter associates a particular identifier with a particular cache way.

In some examples, the first level memory component includes any one of a processor core or a level one cache. In some examples, the second level memory component includes a level two cache.

A non-transitory computer-readable medium, having instructions recorded thereon that, when executed by a computing device, causes the computing device to perform operations is disclosed. The operations include determining whether to apply a mask to a cache line that includes a first type of data and a second type of data for transmission based upon a first criteria. The second type of data is filtered from the cache line, and the first type of data along with an identifier of the applied mask is transmitted. The first type of data and the identifier is received, and the second type of data is combined with the first type of data to recreate the cache line based upon the received identifier.

In some examples, the first criteria includes whether the cache line is executed by an application that does not require precise calculations. In some examples, the first type of data includes useful data and the second type of data includes non-useful data.

In some examples, the applied mask is based upon a user-defined parameter. In some examples, the applied mask is based upon a type of data to be transmitted. In some examples, the identifier is transmitted in a packet header. In some examples, a particular identifier is associated with a particular cache way.

A method for transmitting data is disclosed. The method includes determining whether to apply a mask to a cache line that includes a first type of data and a second type of data for transmission based upon a first criteria. If the determination is positive, the second type of data is filtered from the cache line and the first type of data and an identifier of the applied mask are transmitted. The first type of data and the identifier are received, and the second type of data is combined with the first type of data to recreate the cache line based upon the received identifier. If the determination is negative, the cache line is transmitted and received unconcatenated.

In some examples, a negative determination to apply the mask includes the cache line is executed by an application that requires precise calculations. In some examples, the first type of data includes useful data and the second type of data includes non-useful data.

In some examples, the applied mask is based upon a user-defined parameter. In some examples, the applied mask is based upon a type of data to be transmitted. In some examples, the identifier in a packet header. In some examples, a particular identifier is associated with a particular cache way.

What is claimed is:

1. A method for transmitting data, comprising:
   determining whether to apply a first mask to a first cache line for transmission based upon a first criteria, wherein the first cache line includes a first type of data and a second type of data;
   filtering the second type of data from the first cache line;
   transmitting the first type of data and an identifier of the applied first mask;
   receiving the first type of data of the first cache line and the first identifier;
   combining the second type of data of the first cache line with the first type of data of the first cache line to recreate the first cache line based upon the received first identifier;
   determining whether a subsequent transmission of a second cache line, including a first type of data and a second type of data, requires application of a second mask or if an invalidation occurs; and
   if the subsequent transmission does not require application of the second mask or an invalidation has not occurred, transmitting the first type of data of the second cache line without transmitting the first identifier, receiving the first type of data of the second cache line, and combining the second type of data of the second cache line with the first type of data of the second cache line to recreate the second cache line based upon the first identifier; or
   if the subsequent transmission requires application of a second mask or an invalidation occurs, transmitting the first type of data of the second cache line and a second identifier, receiving the first type of data of the second cache line and the second identifier, and combining the second type of data of the second cache line with the first type of data of the second cache line to recreate the second cache line based upon the received second identifier.

2. The method of claim 1, wherein the first criteria includes whether the first or second cache line is executed by an application that does not require a first type of calculations.

3. The method of claim 1, wherein the first type of data includes bits used in a calculation to be executed and the second type of data includes bits that are not used in the calculation.

4. The method of claim 1, wherein the applied first or second mask is based upon a user-defined parameter.

5. The method of claim 1, wherein the applied first or second mask is based upon a type of data to be transmitted.

6. The method of claim 1, further comprising transmitting the first or second identifier in a packet header.

7. The method of claim 1, further comprising associating the first or second identifier with a respective particular cache way.

8. The method of claim 1, further comprising:
if it is determined to not apply the first or second mask for the first or second cache line;
transmitting the first or second cache line unconcatenated; and
receiving the unconcatenated first or second cache line.

9. An apparatus, comprising:
a first level memory component configured to transmit a first cache line and a subsequent second cache line, wherein the first and second cache lines include a first type of data and a second type of data;
a first mask filter operatively coupled to the first level memory component, the first mask filter configured to:
determine whether to apply a first mask to the first cache line for transmission based upon a first criteria;
filter the second type of data from the first cache line; and
transmit the first type of data and a first identifier of the applied first mask over an interconnect fabric;
determine whether the subsequent transmission of the second cache line requires application of a second mask or if an invalidation occurs; and
if the subsequent transmission does not require application of the second mask or an invalidation has not occurred, transmit the first type of data of the second cache line without transmitting the first identifier; or
if the subsequent transmission requires application of a second mask or an invalidation occurs, transmit the first type of data of the second cache line and a second identifier;
a second mask filter, operatively coupled to the first mask filter via the interconnect fabric, configured to:
receive the first type of data of the first cache line and the first identifier; and
combine the second type of data of the first cache line with the first type of data of the first cache line to recreate the first cache line based upon the received first identifier;
receive the first type of data of the second cache line without receiving an identifier, and combine the first type of data of the second cache line with the second type of data of the second cache line based upon the first identifier;
receive the first type of data of the second cache line and the second identifier, and combine the first type of data of the second cache line with the second type of data of the second cache line based upon the second identifier; and
a second level memory component, operatively coupled to the second mask filter, configured to receive the first or second cache line from the second mask filter.

10. The apparatus of claim 9, wherein the first criteria includes whether the first or second cache line is executed by an application that does not require a first type of calculations.

11. The apparatus of claim 9, wherein the first type of data includes bits used in a calculation to be executed and the second type of data includes bits that are not used in the calculation.

12. The apparatus of claim 9, wherein the applied first or second mask is based upon a user-defined parameter.

13. The apparatus of claim 9, wherein the applied first or second mask is based upon a type of data to be transmitted.

14. The apparatus of claim 9, wherein the first mask filter is further configured to transmit the first or second identifier in a packet header.

15. The apparatus of claim 9, wherein the first mask filter is further configured to associate the first or second identifier with a particular respective cache way.

16. The apparatus of claim 9, wherein the first level memory component includes any one of a processor core or a level one cache.

17. The apparatus of claim 9, wherein the second level memory component includes a level two cache.

18. A non-transitory computer-readable medium, having instructions recorded thereon that, when executed by a computing device, cause the computing device to perform operations comprising:
determining whether to apply a first mask to a first cache line for transmission based upon a first criteria, wherein the first cache line includes a first type of data and a second type of data;
filtering the second type of data from the first cache line;
transmitting the first type of data and an identifier of the applied first mask;
receiving the first type of data of the first cache line and the first identifier;
combining the second type of data of the first cache line with the first type of data of the first cache line to recreate the first cache line based upon the received first identifier;
determining whether a subsequent transmission of a second cache line, including a first type of data and a second type of data, requires application of a second mask or if an invalidation occurs; and
if the subsequent transmission does not require application of the second mask or an invalidation has not occurred, transmitting the first type of data of the second cache line without transmitting the first identifier, receiving the first type of data of the second cache line, and combining the second type of data of the second cache line with the first type of data of the second cache line to recreate the second cache line based upon the first identifier; or
if the subsequent transmission requires application of a second mask or an invalidation occurs, transmitting the first type of data of the second cache line and a second identifier, receiving the first type of data of the second cache line and the second identifier, and combining the second type of data of the second cache line with the first type of data of the second cache line to recreate the second cache line based upon the received second identifier.

19. The non-transitory computer-readable medium of claim 18, wherein the first criteria includes whether the first or second cache line is executed by an application that does not require a first type of calculations.

20. The non-transitory computer-readable medium of claim 19, wherein the first type of data includes bits used in a calculation to be executed and the second type of data includes bits that are not used in the calculation.

21. The non-transitory computer-readable medium of claim 19, wherein the applied first or second mask is based upon a user-defined parameter.

22. The non-transitory computer-readable medium of claim 19, wherein the applied first or second mask is based upon a type of data to be transmitted.

23. The non-transitory computer-readable medium of claim 18, further comprising transmitting the first or second identifier in a packet header.

24. The non-transitory computer-readable medium of claim 18, further comprising associating the first or second identifier with a respective particular cache way.

* * * * *